United States Patent Office 3,323,017
Patented May 30, 1967

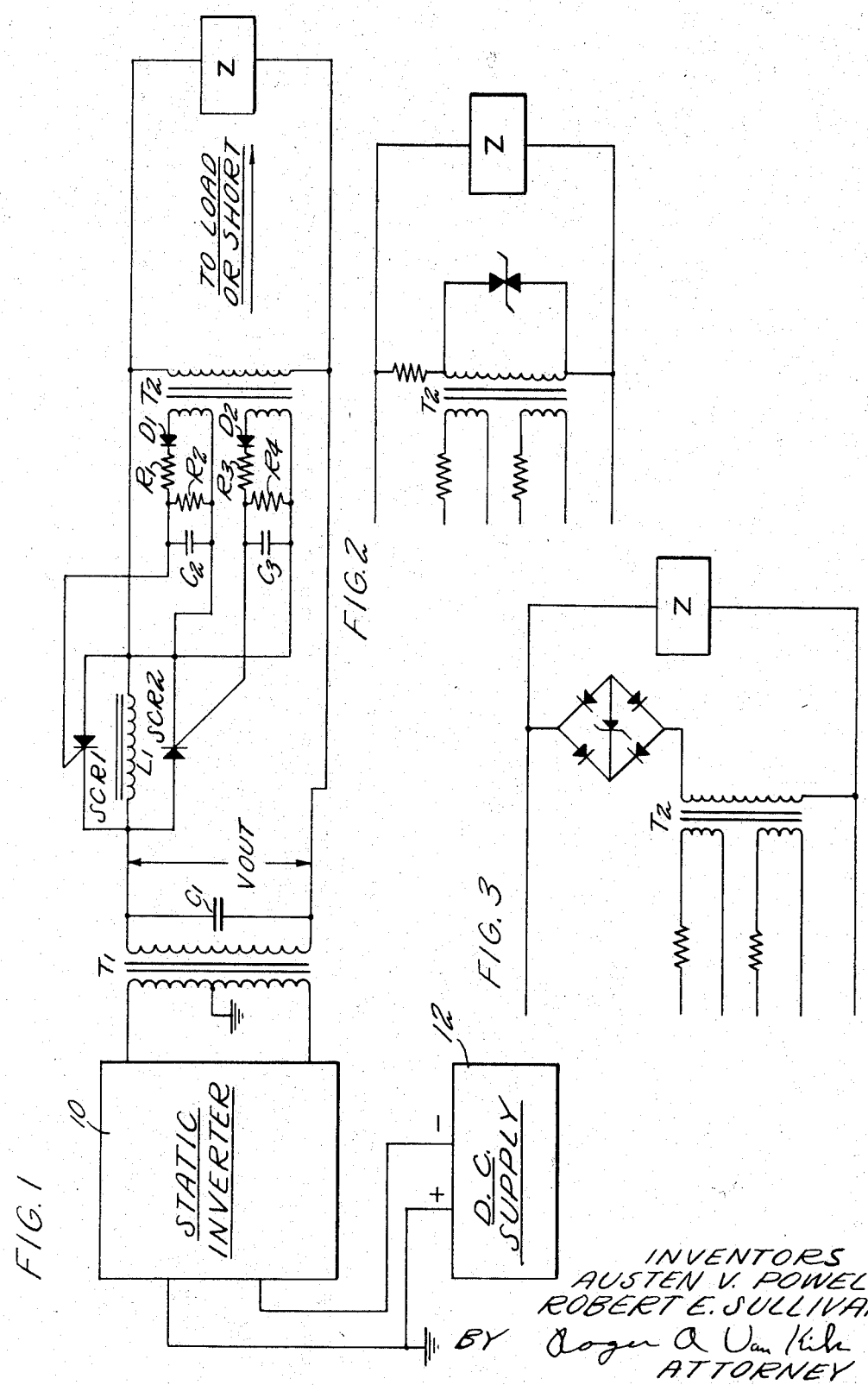

---

3,323,017
OVERLOAD PROTECTOR FOR A SOURCE OF ELECTRICAL ENERGY
Austen V. Powell, Broad Brook, Conn., and Robert E. Sullivan, East Longmeadow, Mass., assignors to United Aircraft Corporation, East Hartford, Conn., a corporation of Delaware
Filed Jan. 28, 1964, Ser. No. 340,747
6 Claims. (Cl. 317—20)

This invention relates to means for limiting the maximum amount of current that can be drawn from a source of electrical energy. More particularly, this invention is directed to a device for protecting such a source of energy against short-circuits or overloads.

While this invention may be utilized to prevent excessive current from being drawn from any source of electrical energy under overload conditions, it has particular utility in the field of static power supplies. Static power supplies or static inverters as they are generally known are devices which produce alternating current from direct current without an operational dependence on relative mechanical motion between component parts. The conventional method of providing short-circuit or overload protection for an inverter involves detecting the output current and using a voltage proportional to this current to override the voltage regulator control loop in the inverter. In so doing, the duty ratio of the power handling devices in the output or power switch stage of the inverter is decreased and safe operation results. However, when the requirements of the inverter, as is often the case, call for a minimum output current under short circuit conditions for operation of other protective devices such as fuses, considerable stress is placed on the power handling devices. A similar situation exists when the load on the inverter is nonlinear. An example of this occurs in starting any nonlinear load such as an induction motor, which demands high starting current until the back EMF builds up, or a lamp load, which has low resistance until the filaments are sufficiently heated. For a discussion of static inverters in general, reference may be made to the articles by Sorenson entitled "Design Techniques for Static Inverters" which appeared in the January and February 1960, issues of Electrical Manufacturing. The discussion of Figures 52 and 53 in the February article describes the above-mentioned prior art method of providing short circuit protection for a static inverter.

This invention overcomes the above-discussed disadvantages of prior art overload protectors by providing novel circuitry which limits but does not disrupt the current which can be drawn from a source of electrical energy whenever the load voltage falls below a predetermined level.

It is therefore an object of this invention to provide a novel overload protector for a source of electrical energy.

It is another object of this invention to provide an overload protector for a source of electrical energy which will provide a desired amount of current under total or partial short circuited load conditions.

It is yet another object of this invention to control the current which will be supplied from a source of electrical energy to a nonlinear load under starting conditions.

It is also an object of this invention to provide a short-circuit or overload protector for a source of electrical energy which is less expensive and more reliable than those previously available.

These and other objects of this invention are accomplished by a novel circuit which places a series impedance between the output terminals of a source of electrical energy and a load whenever the load voltage falls below a predetermined level thereby indicating a total or partial short-circuit.

This invention may be better understood and its numerous advantages will become apparent to those skilled in the art by reference to the accompanying drawing wherein:

FIGURE 1 illustrates a preferred embodiment of the novel overload protector which comprises this invention.

FIGURE 2 illustrates an alternate circuit which may be utilized to provide control signals for the apparatus of FIGURE 1.

FIGURE 3 illustrates another alternate circuit which may be utilized to provide control signals for the apparatus of FIGURE 1.

Referring now to FIGURE 1, reference numeral 10 refers to a single phase static inverter which, for example, may be the self-oscillating type disclosed in FIGURES 1 and 2 of the above-mentioned article by Sorenson from the January 1960, issue of Electrical Manufacturing. The direct current which is to be converted into an alternating current is furnished by a direct current source 12 which may be a battery, array of solar cells, fuel cell or any other like source of direct current. Inverter 10 comprises, in part, an output stage consisting of a pair of switches connected in push-pull between a first polarity terminal of the direct current supply 12 and opposite ends of the primary winding of an output transformer T1. The center tap of the primary winding of transformer T1 is connected to the other or opposite polarity terminal of D.C. supply 12. In operation, the push-pull connected switches are alternately closed thereby causing current to alternately flow in opposite direction in opposite halves of the primary winding of output transformer T1. The current flow in the primary of T1 causes an A.C. voltage to be induced in the secondary winding of this transformer. Without filtering, this induced voltage will have a square wave form. If, as is the usual case, a sinusoidal output voltage is desired, a capacitor C1 may be connected in parallel with the secondary winding of transformer T1 and, in conjunction with the secondary winding, will function as a filter to convert the induced square wave to a sinusoidal wave. The A.C. output voltage of the inverter is applied, through the novel overload protector of this invention, to a load Z.

The overload protector which comprises this invention consists of an impedance which is connected in series with the load Z. As shown in FIGURE 1, this impedance is an inductor L1 which may be linear or which may utilize square loop core material and thus be nonlinear. However, other elements such as a capacitor or resistor or combinations thereof may be substituted for inductor L1. Connected in parallel with inductor L1 are a pair of silicon-controlled rectifiers SCR1 and SCR2. As will be explained below, either one of the SCR's is always conducting under normal conditions and thus inductor L1 is normally short-circuited.

Connected in parallel with the load is the primary winding of a sensing transformer T2. Transformer T2 typically will be a light-weight transformer with a high impedance since it only supplies sufficient power to render the SCR's conductive. Transformer T2 has a pair of secondary windings each of which will have a voltage induced therein proportional to the voltage across the primary winding which, of course, is the load voltage. The voltages induced in the two secondary windings of the transformer T2 will respectively be rectified by diodes D1 and D2. The voltage provided by diode D1 is applied to an RC filter circuit consisting of resistor R1 and capacitor C2. Thus, a D.C. voltage proportional to the load voltage will appear across capacitor C2. This D. C. voltage is applied as the control voltage for SCR1. Under normal conditions, that is with a substantial load on inverter 10, the control voltage will be sufficient to bias SCR1 on and gate current will flow therethrough on a continuous basis. Similarly, the voltage provided by diode D2 is applied to an RC filter consisting of resistor R3 and capacitor C3. The D.C. voltage across capacitor C3 is applied as the control voltage for SCR2 and thus gate current will also flow through this element on a continuous basis. With gate current continuously flowing, SCR1 and SCR2 will alternately conduct depending on the polarity of the inverter output voltage. That is, SCR1 only conducts during negative half-cycles of the inverter output voltage while SCR2 conducts during positive half-cycles of the output voltage.

From the foregoing, it can be seen that either SCR1 or SCR2 will be conducting at all times when there is a substantial load impedance and inductor L1 will thus normally be short-circuited. However, under either short-circuit or overload conditions, such as occurs during the starting of an induction motor load, the voltage across the primary winding of transformer T2 will decrease. As the load increases toward a direct short, less voltage is induced in the secondary windings of transformer T2 and, accordingly, less voltage is available for triggering the SCR's. When a point is reached where the SCR's are no longer biased on, inductor L1 will be placed in series with the load and the load or short circuit current will be limited to the value $$I = \frac{V_{out}}{X_{L1}}$$

Resistors R2 and R4 provide rapid discharge paths for capacitors C2 and C3 under fault conditions so that the overload protector of this invention will respond instantaneously to a sudden drop in the load voltage.

FIGURES 2 and 3 depict alternate methods for supplying gate current to the SCR's. By substituting the embodiments of either of FIGURE 2 or 3 for the diode and filter networks of FIGURE 1, A.C. firing of the SCR's is accomplished. That is, with these embodiments, gate current for the SCR's will flow in synchronism with the applied A.C. source voltage.

While a preferred embodiment has been shown and described, various modifications and substitutions may be made without deviating from the spirit and scope of this invention. Thus, this invention is described by way of illustration rather than limitation and accordingly it is understood that this invention is to be limited only by the appended claims taken in view of the prior art.

We claim:
1. An overload protector for a source of electrical energy, adapted to be connected to a load which is to be energized thereby, comprising:
    an impedance element adapted to be connected between the source of electrical energy and the load,
    voltage controlled switch means connected in parallel with said impedance, said switch means being settable into a conductive state in response to a control voltage in excess of a predetermined magnitude and otherwise being in a nonconductive state;
    sensing means for sensing a voltage across the load,
    control means electrically connected to said sensing means for generating a control voltage proportional to the load voltage,
    conductor means for applying said control voltage to said switch means whereby said switch means conducts at all times when said control voltage is above said predetermined magnitude thereby short circuiting said impedance element during normal operation, said impedance element being placed in series with the load when said control voltage falls below said predetermined magnitude.

2. The apparatus of claim 1 wherein said switch means comprises:
    a solid state switching circuit.

3. An overload protector for a source of alternating current electrical energy, adapted to be connected to a load which is to be energized thereby, comprising:
    an impedance element adapted to be connected between the source of alternating current electrical energy and the load,
    first and second voltage controlled unidirectional switch means connected in parallel with said impedance element, said switch means being connected in mutually opposite polarity, each of said first and second switch means being setable into a conductive state in response to a control voltage in excess of a predetermined magnitude and otherwise being in a nonconductive state;
    sensing means for sensing a voltage across the load;
    control means electrically connected to said sensing means for generating first and second control voltages, each proportional to the average value of a respective phase of the load voltage;
    conductor means for applying said first and second control voltages to said first and second switch means respectively whereby one of said switch means conducts at any one time when said control voltages are above said predetermined magnitude thereby short circuiting said impedance element, during normal operation, said impedance element being placed in series with the load when said control voltages fall below said predetermined magnitude.

4. The apparatus of claim 3 wherein said first and second switch means each comprises:
    a solid state device having a cathode, an anode and a control electrode.

5. The apparatus of claim 4 wherein said solid state devices are connected in opposite polarity across said impedance element.

6. The apparatus of claim 5 wherein said sensing means comprises:
    a transformer having a primary winding and a pair of secondary windings, said primary winding being connected in parallel with the load.

References Cited

UNITED STATES PATENTS

| | | | |
|---|---|---|---|
| 3,217,239 | 11/1965 | Lunney | 323—43.5 |
| 3,249,807 | 5/1966 | Nuckolls | 315—199 |
| 3,273,018 | 9/1966 | Goldberg | 317—20 |

MILTON O. HIRSHFIELD, *Primary Examiner.*

JOHN F. COUCH, *Examiner.*

K. D. MOORE, R. V. LUPO, *Assistant Examiners.*